United States Patent
Matthews et al.

(10) Patent No.: US 9,593,912 B2
(45) Date of Patent: *Mar. 14, 2017

(54) DYNAMIC TARGETING AND TRAINING SYSTEM

(71) Applicant: SureFire, LLC, Fountain Valley, CA (US)

(72) Inventors: John W. Matthews, Newport Beach, CA (US); Mark Squire, San Diego, CA (US); Murray Dunn, Encinitas, CA (US)

(73) Assignee: SureFire, LLC, Fountain Valley, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/005,995

(22) Filed: Jan. 25, 2016

(65) Prior Publication Data

US 2016/0138892 A1   May 19, 2016

Related U.S. Application Data

(63) Continuation of application No. 13/679,650, filed on Nov. 16, 2012, now Pat. No. 9,250,039.

(60) Provisional application No. 61/561,739, filed on Nov. 18, 2011.

(51) Int. Cl.
| | | |
|---|---|---|
| *F41G 3/26* | (2006.01) | |
| *F41J 5/02* | (2006.01) | |
| *G01S 3/784* | (2006.01) | |

(52) U.S. Cl.
CPC ......... *F41G 3/2655* (2013.01); *F41G 3/2661* (2013.01); *F41J 5/02* (2013.01); *G01S 3/784* (2013.01)

(58) Field of Classification Search
CPC .......... F41A 33/00; F41A 33/02; F41A 33/04; F41A 33/06; F41G 3/26; G09B 9/003
See application file for complete search history.

(56) References Cited

U.S. PATENT DOCUMENTS

| | | |
|---|---|---|
| 8,632,338 B2 | 1/2014 | Miasnik |
| 2001/0026266 A1 | 10/2001 | Schena et al. |
| 2005/0058352 A1 | 3/2005 | Deliwala |
| 2006/0279538 A1 | 12/2006 | Chang et al. |
| 2007/0190494 A1 | 8/2007 | Rosenberg |
| 2008/0098640 A1 | 5/2008 | Sammut et al. |

FOREIGN PATENT DOCUMENTS

| | | |
|---|---|---|
| DE | 102005033359 | 1/2007 |
| EP | 0285586 | 10/1988 |
| FR | 2878615 | 6/2006 |
| WO | WO 99/47879 | 9/1999 |
| WO | WO 2005/116686 | 12/2005 |

*Primary Examiner* — Timothy A Musselman
(74) *Attorney, Agent, or Firm* — Haynes and Boone, LLP

(57) ABSTRACT

A live-fire simulation system uses a position sensitive detector (PSD) in a weapon-mounted sensor to intercept emitted light from target emitters spatially distributed about a target. Each target emitter is modulated with a unique frequency. The system can thus not only determine the points of interception on the PSD but also determine which emitter caused which interception by using a frequency analysis.

28 Claims, 9 Drawing Sheets

DYNAMIC TARGETING AND TRAINING SYSTEM

CROSS-REFERENCE TO RELATED APPLICATIONS

This patent application is a continuation of U.S. patent application Ser. No. 13/679,650 filed Nov. 16, 2012, which claims the benefit of U.S. Provisional Patent Application No. 61/561,739 filed Nov. 18, 2011, all of which are hereby incorporated by reference in their entirety.

TECHNICAL FIELD

The present disclosure generally relates to a relative position detection system and more particularly to a system for determining a relative orientation of a device relative to one or more targets or other objects for use in a targeting and/or shooting simulation system.

BACKGROUND

Small arms weapons training uses relatively costly ammunition and is inherently dangerous. Thus, various dry-fire training systems have been developed. There is a particular need for such a dry-fire training system in the area of firearms training for law enforcement and the military because realistic training is critical to the effective use of firearms in crisis situations. However, conventional firearms training does not enable the average shooter to develop the muscle memory necessary to quickly and accurately acquire a target or effectively make a decision regarding use of a firearm in a high-stress situation.

It is extremely difficult to create an effective dry-fire system that simulates live-fire practice. For example, it is conventional to array a plurality of light emitters such as light emitting diodes (LEDs) across a target. A gun-mounted focal plane imager such as a CCD or CMOS pixel array then images the emitters. Although relatively inexpensive, focal plane imagers have limited frame rates. For example, a conventional frame rate is 30 frames per second. Such a sensor can thus image the target emitters only 30 times a second. This is problematic in that it improves simulation accuracy if the focal plane imager can distinguish between groups of LEDs. In that regard, it is conventional to modulate the emitters with different flashing or blinking frequencies. But a sampling rate of 30 times a second can only distinguish up to a 15 Hz difference in modulation frequencies. Thus, the limited frame rate of conventional focal plane imagers greatly restricts the frequency band across which various LEDs could be assigned unique modulation frequencies.

Another problem for conventional focal plane imager dry-fire systems is that complex image processing techniques are required in that the various target emitters are focused onto groups of pixels on the array. To find the various pixels corresponding to each focused target emitter requires an examination of each pixel and correspondingly complex image processing schemes.

Accordingly, there is a need in the art for relatively inexpensive yet accurate dry-fire training systems.

SUMMARY

In accordance with an embodiment, a live-fire simulation system sensor is provided that includes: a position sensitive device (PSD) having a detector; optics for focusing light from target emitters onto the PSD's detector; a processing circuit for digitizing output signals from the PSD; and a digital signal processor configured to obtain a spectrum from the digitized output signals to detect spectral peaks corresponding to individual ones of the target emitters and to calculate a pointing angle from the planar detector to each target emitter from the spectral peaks.

In accordance with another embodiment, a method of calculating an aim point is provided that includes: providing a target having a plurality of spatially-distributed target emitters, each target emitter emitting light at a different modulated frequency; focusing the emitted light from the emitters to form focused spots on a position sensitive detector (PSD), the PSD configured to provide a plurality of output signals relating to an interception location for each of the focused spots; obtaining spectrums from the PSD output signals; identifying spectral peaks in the spectrums; calculating pointing angles from the PSD to the emitters using the identified spectral peaks; calculating a range to the emitters from the pointing angles and the spatial distribution of the emitters; and calculating an aim point on the target based upon the calculated range and the pointing angles.

In accordance with another aspect of the disclosure, a live-fire simulation system is provided that includes: a plurality of target emitters spatially distributed about a target, each target emitter being modulated with a unique modulation frequency; a weapon-mounted sensor including a position sensitive detector (PSD) intercepting modulated light from the emitters to produce a plurality of output signals relating to interception locations on the PSD; and a processor for determining pointing angles from the PSD to the emitters based upon functions of the output signals.

BRIEF DESCRIPTION OF THE FIGURES

Embodiments of the present disclosure and their advantages are best understood by referring to the detailed description that follows. It should be appreciated that like reference numerals are used to identify like elements illustrated in one or more of the figures.

DETAILED DESCRIPTION

The following description is presented to enable any person skilled in the art to make and use the invention. For purposes of explanation, specific nomenclature is set forth to provide a thorough understanding of the present invention. Descriptions of specific embodiments or applications are provided only as examples. Various modifications to the embodiments will be readily apparent to those skilled in the art, and general principles defined herein may be applied to other embodiments and applications without departing from the spirit and scope of the invention. Thus, the present invention is not intended to be limited to the embodiments shown, but is to be accorded the widest possible scope consistent with the principles and features disclosed herein.

Figure 1:
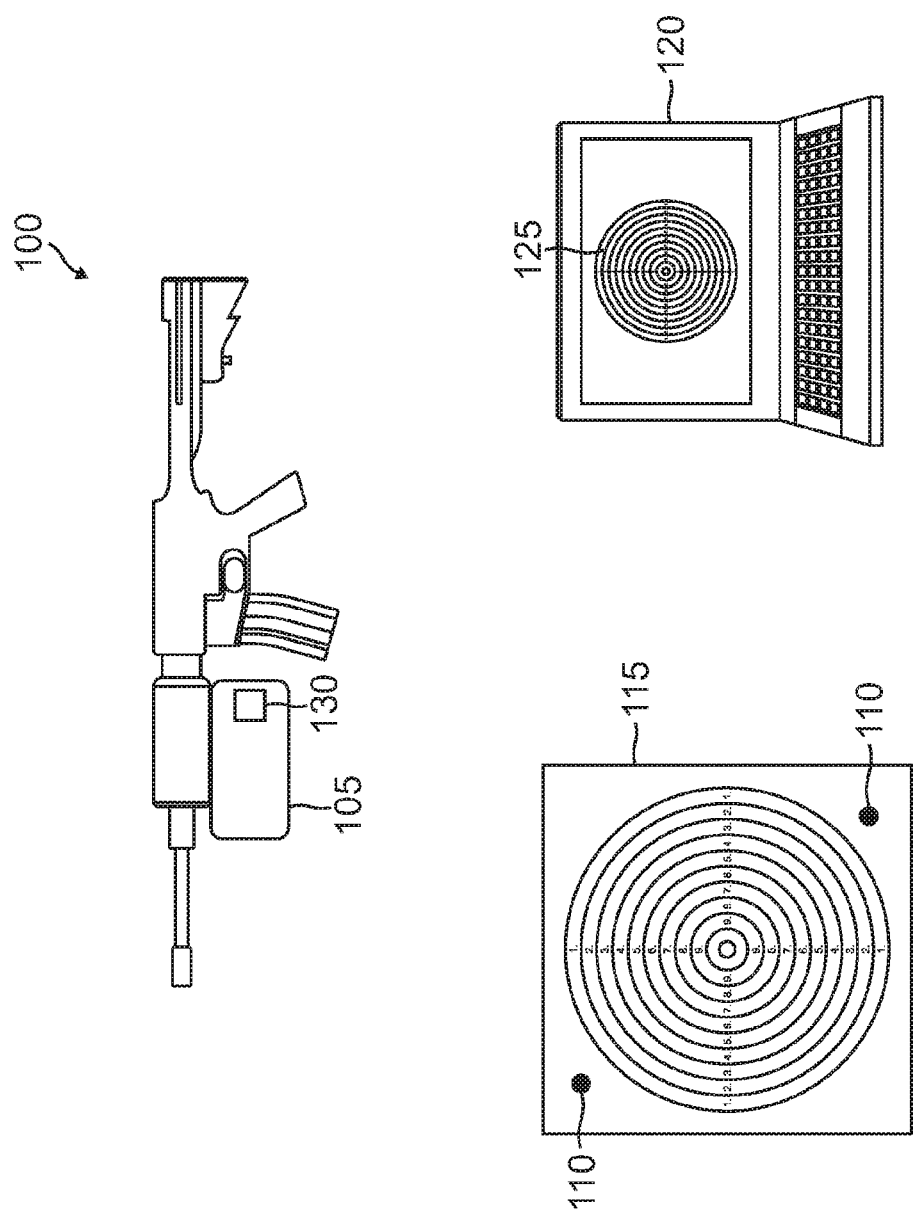
FIG. 1 illustrates an example live-fire simulation system in accordance with an embodiment of the disclosure.

Referring generally to FIG. 1, in an example embodiment a live-fire simulation system 100 includes a weapon-mounted sensor 105 that includes a position sensitive detector (PSD) for measuring the interception points on the PSD (discussed further with regard to FIG. 2) of images of a plurality of emitters such as modulated light-emitting-diodes (LEDs) 110 with regard to a target 115. Sensor 105 also detects a hammer fall from the user actuating the trigger and/or detects when the weapon fires. Sensor 105 determines pointing angles from the PSD to LEDs 110 responsive to sensing the trigger actuation and transmits the pointing angles using a wireless transmitter 130 such as a WiFi, Bluetooth®, or other type of transmitter to a host computer 120 (e.g., a host processor). Alternatively, a wired connection may be used to transmit data from sensor 105 to host computer 120. Host computer 120 calculates the location of an aim point 125 on target 115 from the transmitted angles. Aim point 125 represents where a user would have hit target 115 if live fire were being used. In other embodiments, sensor 105 transmits sampled spectral data to host computer 120, which then calculates the pointing angles remotely from sensor 105.

In an exemplary embodiment, each LED on a particular target or within the target field is modulated with a unique frequency. To distinguish individual LEDs, sensor 105 measures the frequency of each interception point on the PSD. For example, a first LED may flash at 11.4 kHz, a second LED may flash at 11.5 kHz, and so on. In this fashion, sensor 105 may unambiguously identify a given interception point to a corresponding LED. But note that as compared to conventional focal plane imaging dry-fire systems, the output signals from a PSD may be sampled at a relatively high rate. For example, if the pointing angles to the emitters are measured 100 times a second, the PSD output signals may be sampled at, for example, a 51,200 kHz rate. Should sensor 105 provide data for aim point 125 calculation at a 100 Hz rate, there would thus be 512 samples available for every 0.01 second measurement period. The resulting number of samples is then a power of two, thereby enabling the use of a Fast Fourier Transform (FFT). In this fashion, sensor 105 can readily distinguish 100 different LED flash or modulation frequencies at a 100 Hz resolution. Even the most advanced frame rate for focal plane imagers would not achieve such resolution of so many different frequencies.

Sensor

Figure 2:
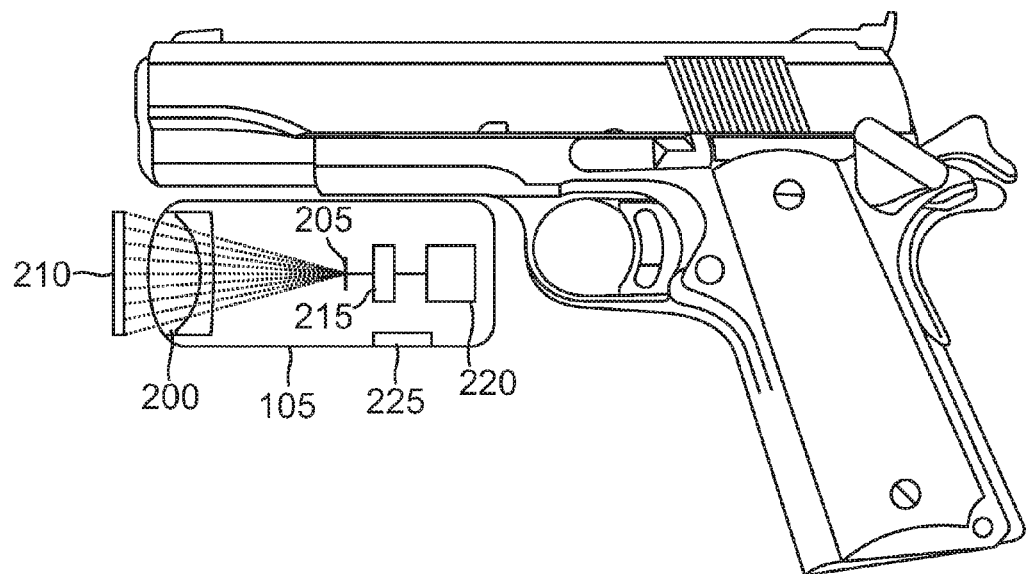
FIG. 2 illustrates a live-fire simulation system sensor in accordance with an embodiment of the disclosure.

As shown in FIG. 2, sensor 105 includes optics 200 that focus light from the target emitters onto corresponding spots on a two-dimensional plane defined by a PSD 205. Optics 200 may be readily designed so that each spot's centroid location is solely dependent on the angle to the corresponding LED 110. For example, optics 200 may comprise an achromatic commercial off-the-shelf lens. Such a lens is compact and requires relatively simple mounting. In other embodiments, various combinations of bi-convex and plano-convex lenses may be used. Regardless of the type of lens, the mounting and tolerances may be relatively relaxed in that any undesired distortion may be readily calibrated out. An optical bandpass filter 210 filters the target emitter light as discussed further herein.

Figure 3:
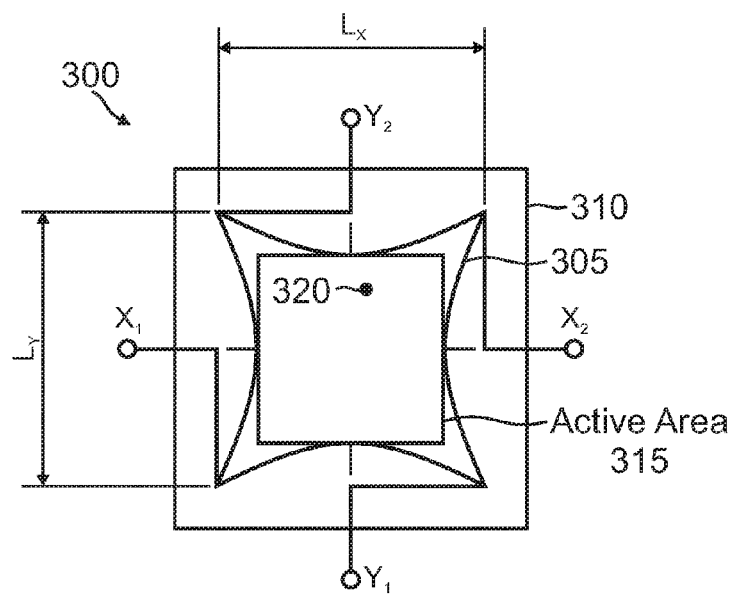
FIG. 3 illustrates a position sensitive detector (PSD) for the sensor of FIG. 2 in accordance with an embodiment of the disclosure.

PSD 205 may comprise a lateral effect position sensing photodiode or a quadrant detector. Lateral effect position sensing photodiodes enable the use of simpler optics 200 within a relatively small circuit package. However, lateral effect position sensing photodiodes are typically more expensive than quadrant detectors. The following discussion will discuss a lateral effect position sensing photodiode embodiment without loss of generality in that it will be readily appreciated that alternative embodiments may be constructed using quadrant detectors. FIG. 3 shows a plan view of an example lateral effect position sensing photodiode 300. Position sensing photodiode 300 includes a uniform resistive layer 305 formed on one surface of a high-resistivity semiconductor substrate 310. An active area 315, which is also a resistive layer, includes a PN junction that generates photocurrent by means of the photovoltaic effect.

When a photon of light strikes position sensing photodiode 300 it will be absorbed and replaced by an electric charge generated at that location. When a spot of light strikes the detector such as a focused emitter spot 320, a current is thus generated at each of the four electrodes, and the location of the centroid of that spot can be determined from the currents out of the four electrodes, represented by $i_{x1}$, $i_{x2}$, $i_{y1}$, and $i_{y2}$ for electrodes $X_1$, $X_2$, $Y_1$, and $Y_2$, respectively The division of current between the four electrodes is effected by the resistive layer 305. The normalized x and y dimensions for a centroid of emitter spot 320 are determined with regard to the x dimension length $L_x$ and the y dimension length $L_y$ for resistive layer 305 and the currents $i_{x1}$, $i_{x2}$, $i_{y1}$, and $i_{y2}$ as $$x = \frac{L_x}{2} \frac{(i_{x2} + i_{y1}) - (i_{x1} + i_{y2})}{i_{x1} + i_{x2} + i_{y1} + i_{y2}} \qquad \text{Eq (1)}$$

-continued $$y = \frac{L_y}{2} \frac{(i_{X2} + i_{Y2}) - (i_{X1} + i_{Y1})}{i_{X1} + i_{X2} + i_{Y1} + i_{Y2}} \quad \text{Eq (2)}$$

Any wavelength of light can be used for the target emitters. However, a near-IR wavelength of 950 nm has certain advantages for both the emitters and the sensor in that solar radiation has a local minimum at that wavelength. Moreover, near-IR LED emitters having a wavelength of 950 nm are readily available. Thus, the following discussion will assume without loss of generality that the emitters are configured to transmit around the 950 nm wavelength.

Solar radiation will typically be the dominant source of optical noise competing with sensing light from the target emitters. As such it sets the upper end of the dynamic range of PSD 205. The center frequency of optional optical bandpass filter 210 may thus be selected to correspond to the emitter wavelength of 950 nm and have a spectrum width of approximately 35 nm to minimize interference from solar radiation. An exemplary commercially available filter is an Andover Corporation 950FS40-25, five cavity, 950 nm center frequency, and 40 nm spectrum width full-width-at-half-maximum (FWHM) filter.

Referring again to FIGS. 1 and 2, LED emitters 110 may be frequency modulated so that sensor 105 can distinguish between individual emitters. Although digital filters such as finite impulse response (FIR) filters may be used, a particularly advantageous algorithm to obtain spectral information is the Fast Fourier Transform (FFT). The photocurrents from PSD 205 in sensor 105 are thus digitized in a front end processing circuit 215 and processed in one embodiment in a suitable processor such as a digital signal processor (DSP) 220 to obtain the FFT spectral data. The calculation of aim point 125 on display 120 is correlated to a user's trigger pull. To sense the vibration resulting from a trigger pull and the resulting action of the firing pin (e.g., hammer fall), sensor 105 may include an inertial sensor such as an accelerometer 225 or other appropriate sensor (e.g., a gyroscope or other motion sensor). For example, accelerometer 225 may comprise a standard 3-axis accelerometer. Sensor 105 can use inertial data in other ways as well. For example, inertial data may be used to determine whether the weapon is pointed at the ground such that sensor 105 could then enter a sleep mode. In addition, inertial data may be used to determine whether a user has canted the weapon. A GPS sensor (not illustrated) may assist in the collection of inertial data.

Note that a weapon is typically sighted in by a user by firing a group of live rounds. The user observes the relationship of where the bullets actually grouped on the target as opposed to the intended grouping. In this fashion, the user may adjust his/her gun sights so the weapon is "sighted in." But such a sighting in is with respect to a particular orientation—typically the weapon is oriented in a vertical plane. For a weapon to hit a target at a given range, the sighting in process most account for gravity drop. In other word, whereas the user is sighting toward the center of the target, the gun barrel is actually displaced from this center such that the bullet travel initially is traveling higher but then drops due to gravity so as to hit the target center. Thus, if a user then cants the weapon out of the vertical plane in a subsequent shot, the shot will not account properly for the drop due to gravity and will also be wide of the intended target. The use of accelerometer 225 (or some other suitable inertial sensor) is thus advantageous because system 100 can then properly simulate not only where a shot should land if the gun is held in a vertical plane but also if the gun is improperly canted by the user.

Figure 4:
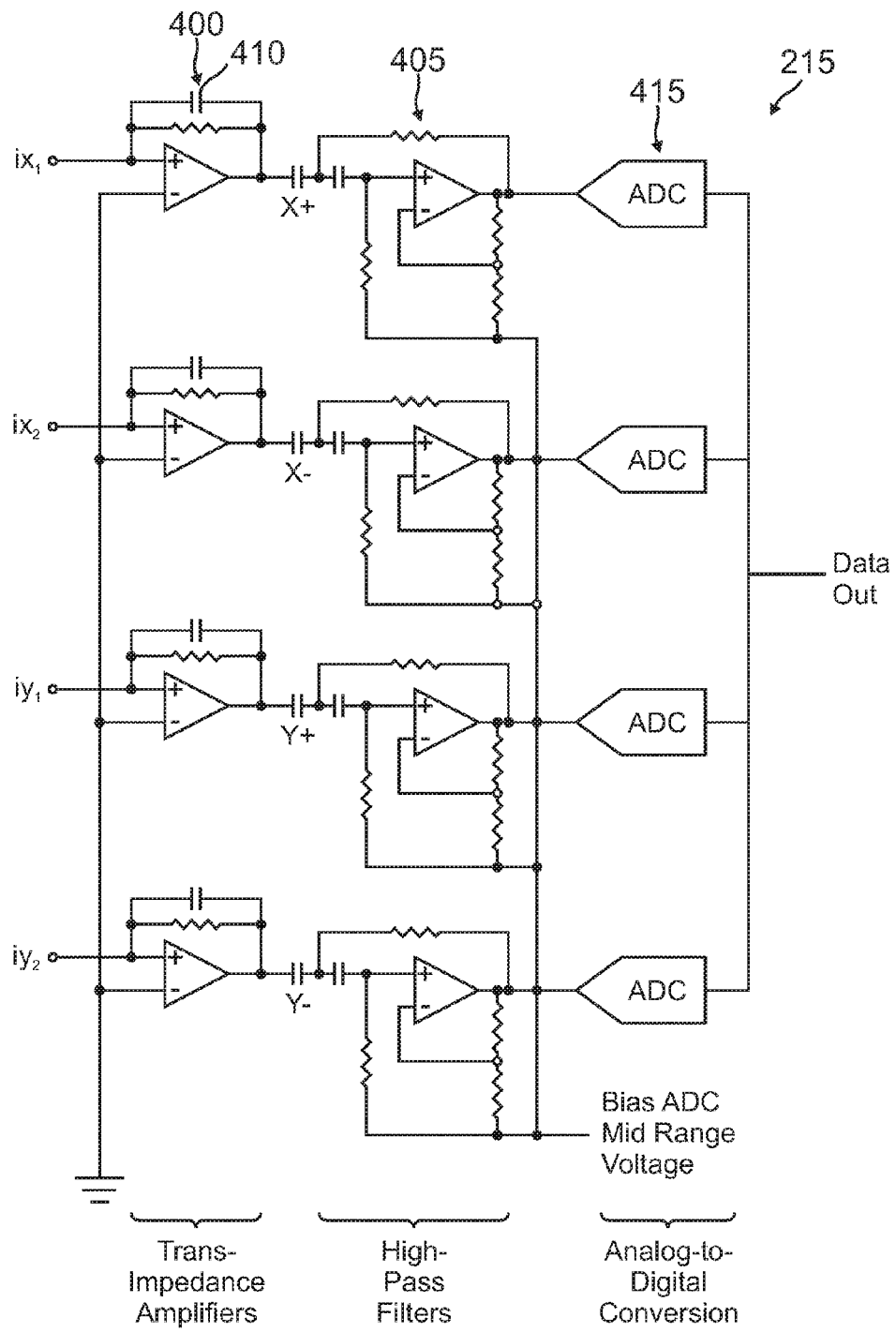
FIG. 4 is a schematic diagram of a front end processing circuit for the sensor of FIG. 2 in accordance with an embodiment of the disclosure.

FIG. 4 is a schematic diagram for front end processing circuit 215. The photocurrents $i_{x1}$, $i_{x2}$, $i_{y1}$, and $i_{y2}$ from PSD 205 may be converted into voltages by corresponding trans-impedance amplifiers 400. Trans-impedance amplifiers 400 may have gain down to DC, have low noise, high dynamic range, and very low distortion. A bypass capacitor 410 for each trans-impedance amplifier 400 stabilizes performance but also reduces bandwidth. Such a bandwidth reduction helps suppress noise that could be aliased into the processed signals. A 3 dB cutoff frequency for each amplifier 400 may be set to about three to ten times a maximum LED flash frequency. The gain of each amplifier may be set so that the brightest sunlight conditions don't saturate operation.

The output voltages from trans-impedance amplifiers 400 may be designated as signals X+, X−, Y+, and Y− corresponding to input photocurrents $i_{x1}$, $i_{x2}$, $i_{y1}$, and $i_{y2}$, respectively. The output voltages may be filtered by corresponding high-pass filters 405 with linear gain. High-pass filters 405 block any DC component of the voltage signals. The output signals from high-pass filters 405 are digitized by corresponding analog-to-digital converters (ADCs) 415. Thus, high-pass filters 405 may be biased with a mid-range input voltage for ADCs 415. In one embodiment, each ADC 415 comprises a sigma-delta converter having a sample rate of approximately 2.1 times the maximum LED flash frequency. For example, the maximum LED flash frequency may be 22.4 kHz such that the ADC sample rate is 51.2 kHz. The resolution of ADCs 415 is 16 to 24 bits in one embodiment.

Figure 5:
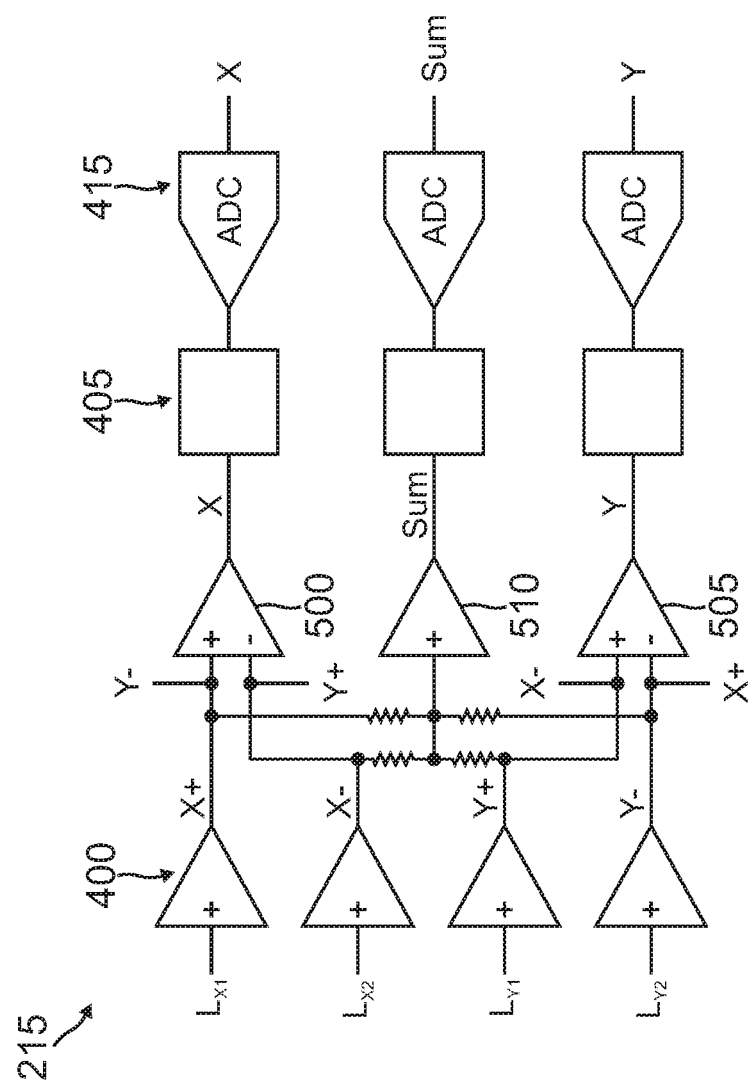
FIG. 5 is a schematic diagram of an alternative front end processing circuit for the sensor of FIG. 2 in accordance with an embodiment of the disclosure.

DSP 220 processes the digitized outputs from ADCs 415 using, for example, an FFT algorithm. In this fashion, the individual LED signals may be distinguished based upon their spectral properties. Front end processing circuit 215 may be simplified to reduce the FFT processing load as follows. As seen in FIG. 5, the voltage signal outputs from amplifiers 400 for photocurrents $i_{x1}$, $i_{x2}$, $i_{y1}$, and $i_{y2}$ may be designated as X+, X−, Y+, and Y−, respectively. Circuit 215 is simplified to produce three digital outputs: an X output, a sum output, and a Y output. A difference amplifier 500 forms an analog version of the X output equaling (X++Y−)−(Y++X−). Similarly, a difference amplifier 505 forms an analog version of the Y output equaling (Y++X−)−(Y−+X+). A sum amplifier 510 forms an analog version of the sum signal equaling X++X−+Y++Y−. The resulting analog signals may then be filtered in high-pass filters 405 and digitized in ADCs 415 as discussed with regard to FIG. 4.

Referring back to equations (1) and (2), it may be seen that the x and y centroid measurements may be related to the three output signals X, Y, and sum discussed with regard to FIG. 5 as $$x = \frac{L_x * X}{2 * \text{sum}} \quad \text{Eq (3)}$$

$$y = \frac{L_y * Y}{2 * \text{sum}} \quad \text{Eq (4)}$$

DSP 220 may thus merely obtain an FFT of the X, Y, and sum output signals rather than the digitized versions of X+, X−, Y+, and Y− discussed with regard to FIG. 4. In this fashion, an FFT operation is avoided, thereby allowing the performance requirements for DSP 220 to be relaxed so as to lower cost. The Fourier transform of X, Y, and sum may be represented by $F_X$, $F_Y$, and $F_{sum}$, respectively. The nth frequency component for these transforms may thus be represented by $F_X(n)$, $F_Y(n)$, and $F_{sum}(n)$, respectively. These frequency components have both a real and an imaginary component. The normalized centroid dimensions x and y for the interception spot on PSD 205 are, of course, real. Thus, the real and imaginary components for $F_X(n)$, $F_Y(n)$, and $F_{sum}(n)$ may be processed using known complex number techniques to obtain the corresponding normalized centroid components from equations (3) and (4) with conventional complex number processing techniques. Embodiments that use four FFTs (transforming the four signals X+, X−, Y+, and Y−) enable the use of a frequency dependent gain correction factor for each detector channel at the cost of another FFT operation.

The FFT operations may be overlapped between successive aim point measurements. For example, suppose each FFT uses 1024 samples for an embodiment in which the digital sampling rate is 51.2 kHz and the aim point measurement rate is 100 Hz. The resulting FFT measurements will have 50% overlap between successive aim point measurements. This means every digital sample from circuit 215 will be used in two successive FFT operations, showing up in the first 512 elements on one FFT, then in the latter 512 elements in the next FFT. If the digital samples are considered to be successively numbered from zero, a first FFT operation will be performed on samples 0-1023, a second FFT will be on samples 512-1525, a third FFT will be on samples 1024-2047, and so on. A window function such as Hann function is used in conjunction with the overlapped FFTs. The overlapped FFTs reduce bleed over between channels that occurs when the clock rate on the LED flashing and the ADC sampling are not quite the same.

Figure 6:
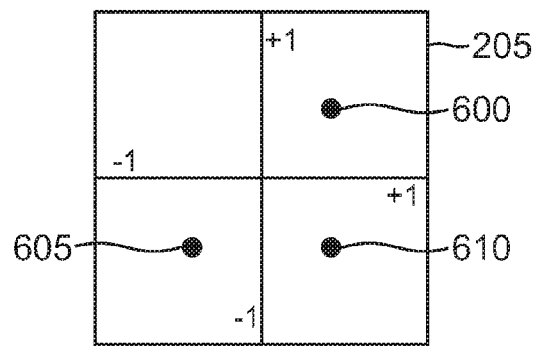
FIG. 6 shows the interception points on a PSD for example target emitter transmissions in accordance with an embodiment of the disclosure.
Figure 7A:
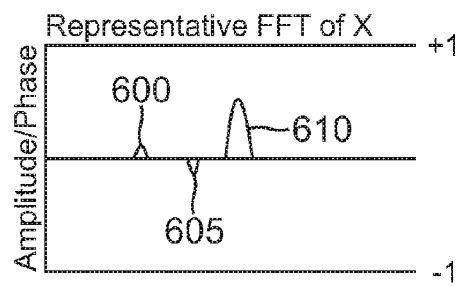
FIG. 7a is an FFT spectrum of a normalized x dimension for the interception points of FIG. 6 in accordance with an embodiment of the disclosure.
Figure 7B:
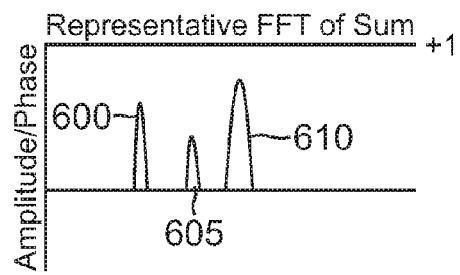
FIG. 7b is an FFT spectrum of a normalized sum signal for the interception points of FIG. 6 in accordance with an embodiment of the disclosure.
Figure 7C:
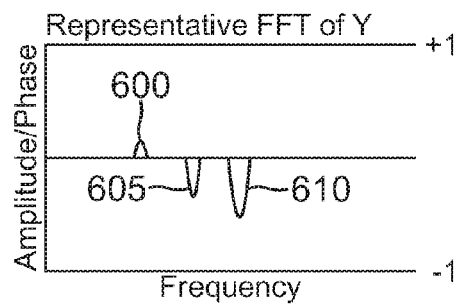
FIG. 7c is an FFT spectrum of a normalized y dimension for the interception points of FIG. 6 in accordance with an embodiment of the disclosure.

The resulting FFT spectrums may be better understood with reference to FIG. 6, which shows the centroids for interception locations on PSD 205 for emitters 600, 605, and 610. FIGS. 7a, 7b, and 7c illustrate the FFT spectrums for signals X, sum, and Y, respectively for the emitters of FIG. 6. A first emitter 600 is relatively lower in frequency and thus occurs first in each spectrum. Since emitter 600 has a normalized x and y dimension that are both positive, the X and Y spectral components for emitter 600 are both positive in amplitude in FIGS. 7a and 7c, respectively. A second emitter 605 has a slightly higher flashing frequency than emitter 600 and is thus in the middle of each spectrum. Emitter 605 has a normalized x and y dimension that are both negative so the corresponding X and Y spectral components are also both negative in FIGS. 7a and 7c, respectively. Finally, a third emitter 610 has the highest flashing frequency and thus has the greatest frequency components. Emitter 610 has a positive normalized x dimension but a negative normalized y dimension. These phases are thus reflected in the X and Y spectral components for emitter 610, in that the normalized x spectral component in FIG. 7a is positive whereas the normalized y spectral component in FIG. 7c is negative.

The sum channel FFT spectrum as shown in FIG. 7b may be examined to detect the presence of individual emitters. A fixed or an adaptive threshold may be used for detection purposes. Since the FFT output is complex, the threshold comparison accounts for this as:

$$F_{sum}(n)F_{sum}*(n) \geq \text{threshold}^2$$

where $F_{sum}(n)$ is the nth component of the sum channel FFT and $F_{sum}*(n)$ is the complement of the nth component of the sum channel FFT.

Figure 8:
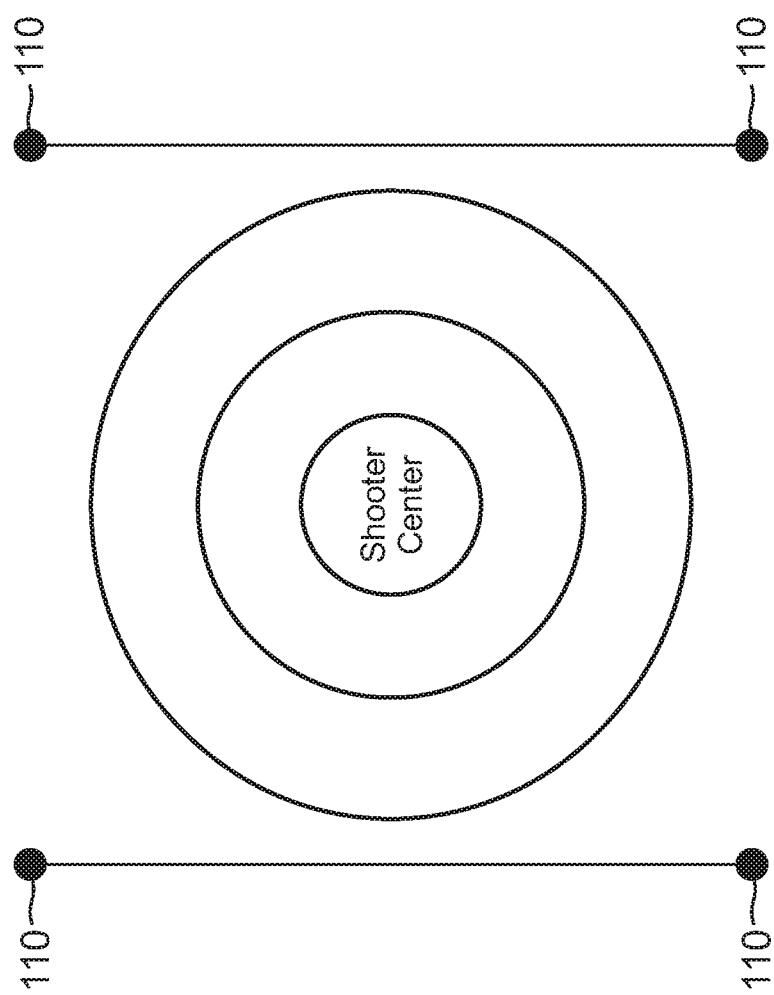
FIG. 8 illustrates an example arrangement of emitters about a target in accordance with an embodiment of the disclosure.
Figure 9:
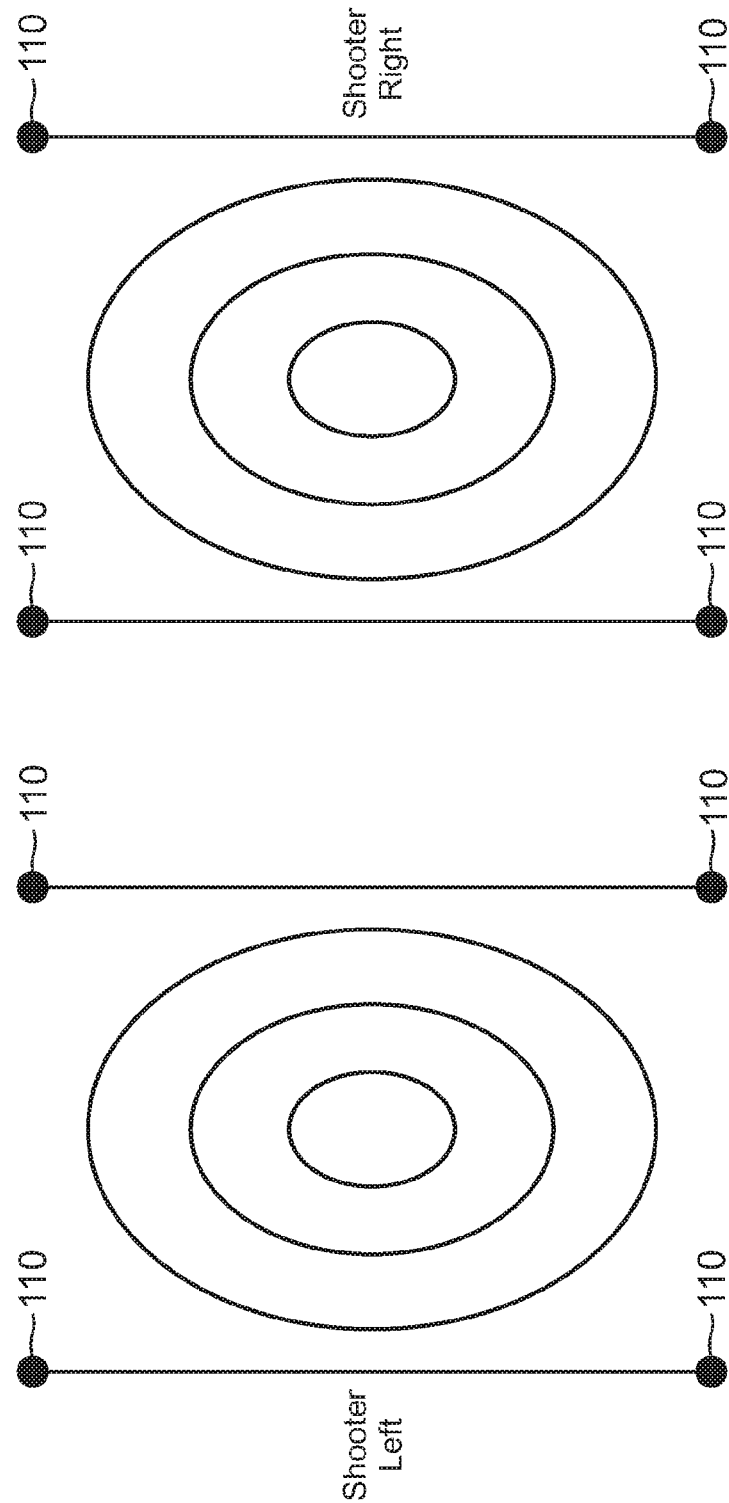
FIG. 9a illustrates the angular positions of the emitters with regard to an observer displaced from a normal to the target in accordance with an embodiment of the disclosure.
FIG. 9*b* illustrates the angular positions of the emitters with regard to an observer oppositely displaced from the observer of FIG. 9*a* in accordance with an embodiment of the disclosure.
Figure 10:
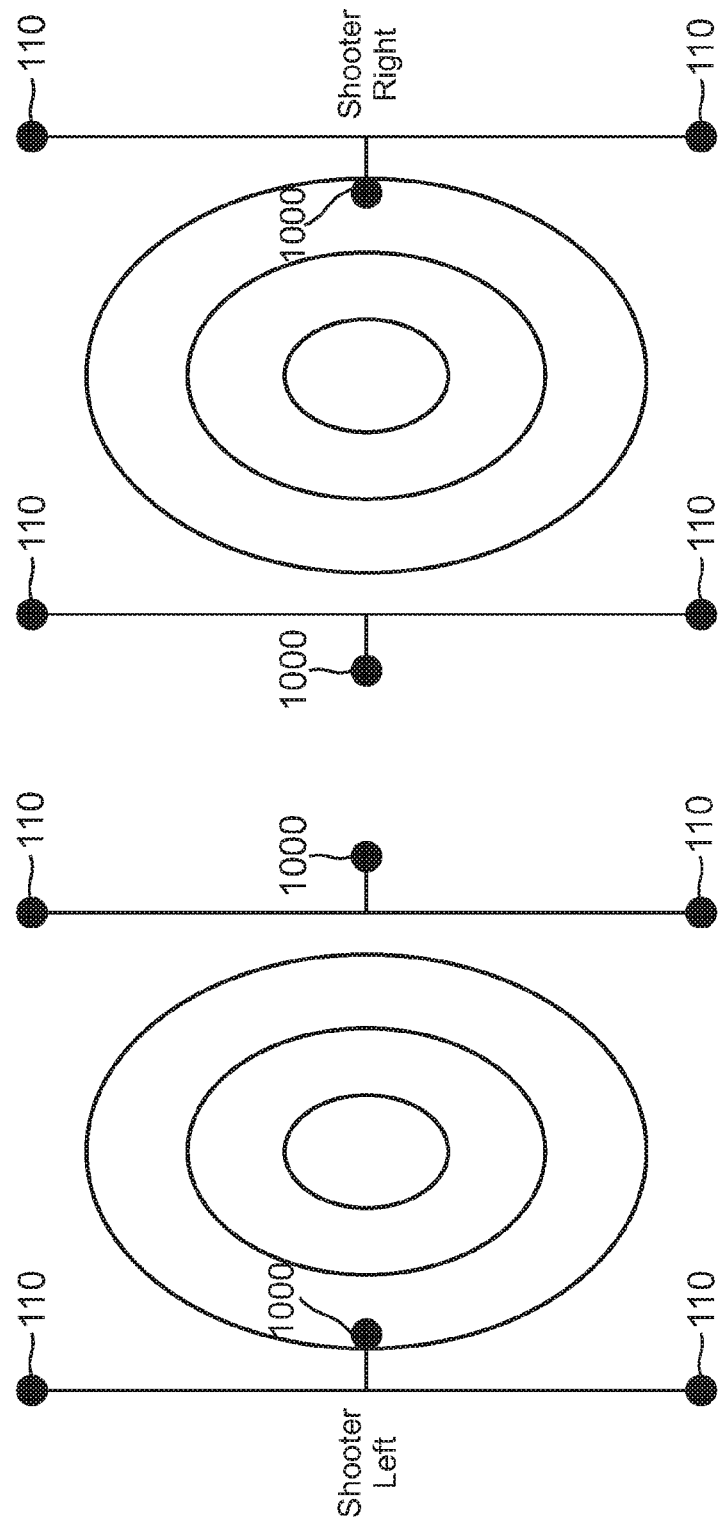
FIG. 10*a* illustrates the angular positions of emitters including out-of-plane emitters with regard to an observer displaced from a normal to the target in accordance with an embodiment of the disclosure.
FIG. 10*b* illustrates the angular positions of emitters including out-of-plane emitters with regard to an observer oppositely displaced from the observer of FIG. 10*a* in accordance with an embodiment of the disclosure.

The advantageous identification of each emitter in frequency enables very precise calculation of the resulting aim point on the target. With regard to a planar target such as a target as shown in FIG. 8, four emitters 110 may be arranged at the four corners of the target. Three emitters would be sufficient but four provide more signal energy and reduce measurement noise in the calculation of the resulting aim point. A planar arrangement of emitters, however, is ambiguous as to the angular location of the shooter—in other words, if the shooter is not aligned with a normal to the target but if instead is displaced to either side of the normal. This ambiguity is seen in FIGS. 9a and 9b. In FIG. 9a, the shooter is aiming at the target from the left of the normal to the target center whereas in FIG. 9b the shooter is aiming at the target from the right of the normal to the target center. But since emitters 110 are all in the same plane, the perceived angular relationship to the emitters 110 is the same in both cases. However, if additional out of plane emitters are provided then the ambiguity can be resolved. For example, FIGS. 10a and 10b show the same angular relationship of the shooter to the targets as in FIGS. 9a and 9b except that the target includes two emitters 1000 that are out of plane with regard to remaining emitters 110. The angular relationship of emitters 1000 to remaining emitters 110 plainly changes in FIGS. 10a and 10b as the shooter moves to either side of the target. Thus, the angular ambiguity is resolved through the use of out-of-plane emitters. In this fashion, host computer 120 can not only calculate the range between the shooter and the target but also can readily determine the location of the shooter, even if the shooter is off axis with regard to a normal to the target.

Sensor Calibration

Sensor 105 may be calibrated to compensate for manufacturing tolerances in the optics, sensors, electronics, and mechanical components of the weapon mounted system. The calibration process should result in a set of calibration coefficients loaded into a non-volatile memory of the weapon mounted sensor system. Since the optics and PSD are rigidly mounted with respect to each other, the calibration is effective for the life of the sensor.

In an exemplary embodiment, the system may have a channel by channel gain correction, and equations for mapping detector measurements to gun barrel referenced measurement angles. The channel gain corrections may be frequency dependent and in some instances the frequency dependence may be folded into the geometric correction coefficients.

A gain correction calibration process may simply illuminate sensor 105 with a single LED flash frequency at a time. Optics 200 are configured to cause the LED to illuminate a large portion of PSD 205 centered on its middle. The amplitude and phase of the signal on each of the four channels for signals X+, X−, Y+, and Y− can be recorded as the flash frequency is stepped through a range of frequencies that encompass the desired LED flash frequency range. This calibration data may be fed into the calculation of the filter coefficients used within front end processing circuit 215. In an embodiment using only three channels as discussed with regard to equations (3) and (4), gain correction may be a static, frequency independent correction applied to all four channels.

The angular mapping calibration process may have the sensor 105 look at a single flashing LED at a distance in an otherwise dark environment while sensor 105 is mounted in a computer-controlled precision azimuth and elevation stage. These stages may have orthogonal motion, a calibrated angle and zero. The mechanical interface between sensor 105 and the calibration system may use the same mechanical interface that will be used to attach the sensor 105 to a weapon (e.g., a Picatinny rail). The azimuth and elevation zeros may then be boresighted to the nominal weapon boresight.

The geometry calibration procedure may involve making measurements on roughly a 10×10 grid of points filling a sensor field of view. The mapping phase of the measurements can be done with the LED flashing at a frequency in the middle of the desired flash frequency range. The calculation of the geometry calibration coefficients may use a least squares fit.

Sensor 105 uses the resulting calibration coefficients to determine an azimuth and elevation angle to each emitter 110 according to, for example, polynomial equations of the normalized x and y dimensions and the calibration coefficients. Sensor 105 may then transmit the azimuth and elevation angles along with the gun shot detection time to host computer 120. Since the separation and spatial arrangement of emitters 110 is known, host computer 120 can then use the angles to determine a range to the target and the resulting aim point.

Target Emitters

Target emitters 110 may comprise LEDs or any suitable source that outputs photons in the desired wavelength. One example of a potentially suitable currently available commercial LED is the Osram SFH 4248. The known spatial distribution of emitters 110 with respect to the target enables the calculation of range using the previously calculated pointing angles to the target emitters so that aim point 125 may be determined. While two light sources on a single target will be sufficient for many applications, the use of three or more light sources provides significant advantages in creating a more robust and accurate system.

The optics molded onto commonly available LEDs produce an axially symmetric beam that is as tall as it is wide. In certain applications described herein, it may be beneficial to have a beam that is much wider than it is tall to correlate to a wide range of shooting locations and angles. An optical diffuser may be used to spread the LED beam into an appropriate pattern. An example of such a commercially available optical diffuser is the Thor Labs ED1-L4100 Line Pattern Engineered Diffuser which has a 100°×0.4° diffusion pattern. The diffuser is a molded optic with a surface pattern with a series of small cylindrical lenses with very dense packing. The combination of the Osram SFH 4248 LED and the diffuser will give a beam of roughly ±65°×±15° illumination pattern.

LEDs 110 may be driven with a wide variety of commercially available signal generators. For example, LEDs 110 may be driven with a square wave generator. Driving each LED 110 with a square wave excites both the fundamental frequency and every odd multiple frequency of the fundamental. The resulting harmonics contain a substantial fraction of the total drive energy (approximately 30%). The harmonic signal energy can be recovered in processing but requires a wider bandwidth processing chain that includes the first several harmonics in the FFT output. Such a recovery requires bigger FFTs and more processing. Alternately, a sine wave generator can drive each LED with a sine wave of the desired frequency and put all the energy in the fundamental frequency. Advantageously, a sigma-delta waveform can be used to generate a sine wave using an efficient MOSFET switch and a digital drive waveform.

Regardless of the particular signal generator used to drive LEDs 110, the use of unique flashing frequencies for each LED 110 enables a determination based on frequency alone where each LED 110 is relative to the sensor system. The range and number of different flashing frequencies depends on system requirements and source and sensor characteristics. For example, if live-fire simulation system 100 is based on one hundred angular measurements per second, such a measurement rate results in a transform limited frequency resolution of 100 Hz. As long as the flash frequencies for the LED's are spaced by 100 Hz or more the LED's will be distinguishable.

In one embodiment, LEDs 110 flash at frequencies between 11,400 to 22,400 Hz in 100 Hz increments, skipping every eighth frequency. That allows for 14 groups of seven contiguous frequencies. All four LED flash frequencies on any given 4-LED target may be assigned frequencies from just one of those groups of seven, allowing for 35 discrete ways to draw a group of four frequencies out of the seven frequency groups. Such an embodiment would provide for a total of 14×7=490 distinct LEDs 110. In such a system, sensor 105 can unambiguously sense the position of the LEDs on up to 14 targets in its field of view simultaneously, as long as each of the 14 targets is from a different group. The sensor will be aware if two targets from the same group are visible at the same time, but it will not be able to establish LED positions for all the LEDs on either target. Skipping every eighth frequency avoids potential problems from differences in the master clock for ADCs 415 and the LED signal generators. Presumably all the LEDs on a target are driven by the same clock, but each target and the ADCs on the sensor may have different physical clocks that are not synchronized. The skip frequency may help to minimize potential interference between targets.

Mechanical targets may be static or dynamic Servo systems or other motion systems such as those used in animatronic applications can be used to create a wide range of mechanical targets that simulate virtually any type of potential target. The motion of mechanical targets can be programmed or controlled from a networked computer at the site or remotely.

Humans or other live targets can be created by attachment of a plurality of target light sources to belts, headbands, vests, or other garments. By using an array of light sources with different flashing frequencies that can be uniquely discriminated, it is possible to accurately determine the precise aim point on a live target even while in motion. This allows the system to discriminate between hits to vital areas such as the head or chest from hits to extremities, providing critical feedback to the user and allowing for far more realistic evaluations in force-on-force simulations. Target size and location is limited only by near-field focus of the optical sensor.

It will be appreciated that numerous alternative embodiments may be constructed with regard to system 100 of FIG. 1. For example, sensor 105 could be implemented without DSP 220 such that host computer 120 would receive the digital samples used to generate the desired FFTs. A sensor 105 that includes DSP 220, however, will greatly reduce the bandwidth requirements for transmission from sensor 105 to host computer 120. In another example, the various operations described herein with regard to DSP 220 may be distributed in any desired fashion between DSP 220 and host computer 120. Moreover, the simulation techniques discussed herein are applicable to other uses besides live-fire simulation such as entertainment (e.g., video games) or other activities.

Other embodiments are also contemplated. In one embodiment, sensor 105 may be implemented with a wide field of view. Once a target is within the field of view of sensor 105, system 100 may precisely track the path and aiming of the weapon. Using such a wide field of view may also allow for longer optical tracking, which will help to understand the shooter's approach to the target.

In another embodiment, an inertial sensor such as accelerometer 225 may be used to track shooter movement between targets and extrapolate position. For example, by implementing accelerometer 225 as a 3-axis accelerometer that measures the acceleration of sensor 105 and further including a 3-axis gyroscope that measures angular rate change, these components may be used to develop an accurate model of the movements of sensor 105 and an attached weapon between targets. In this regard, system 100 may create a model of the weapon position and movement throughout a particular training session. Such a model may be used to develop a visual representation or "replay" of the user's actions, providing valuable feedback about weapon deployment and target acquisition techniques.

Figure 11:
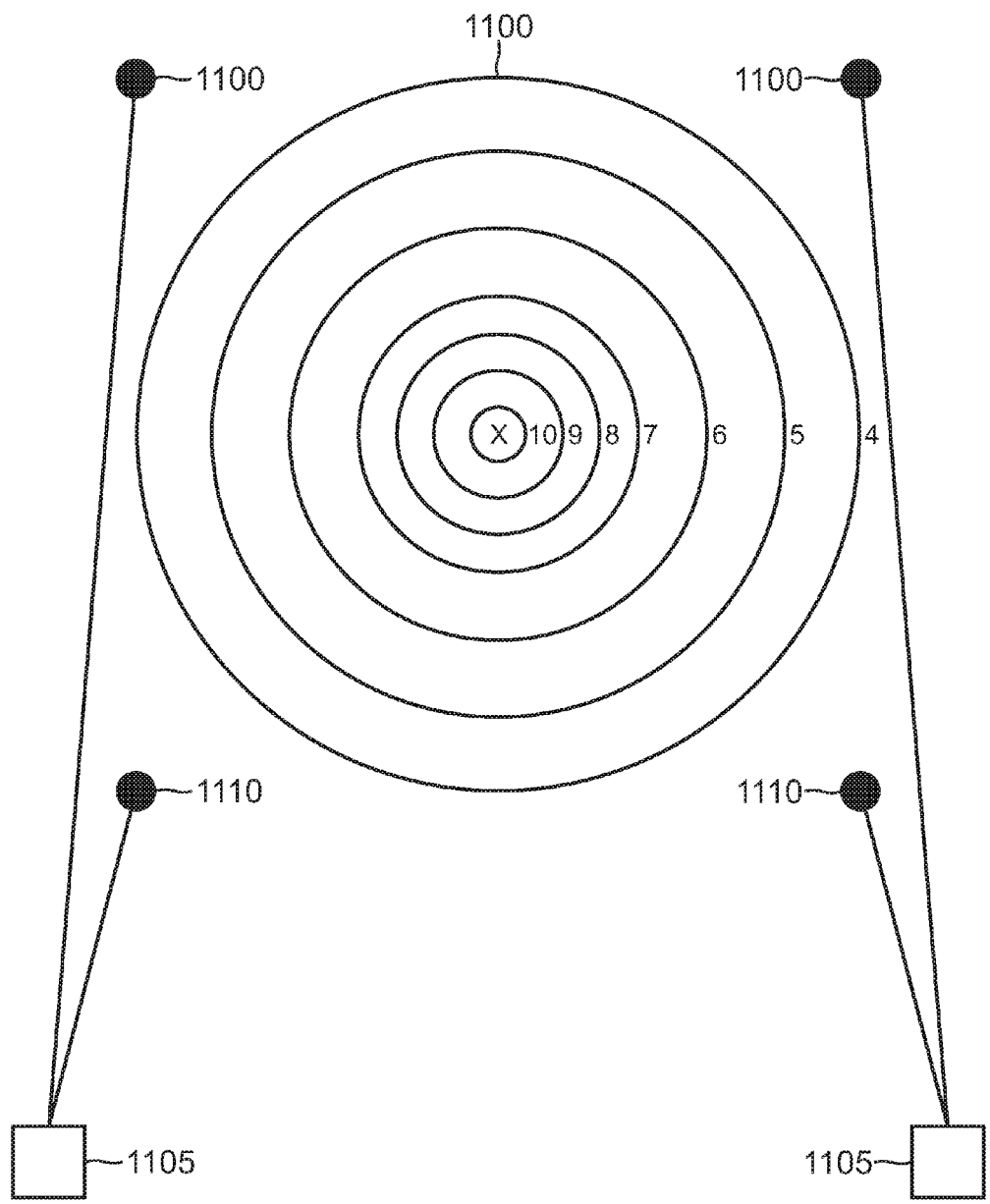
FIG. 11 shows a plurality of modulated lasers arranged to project onto a target in accordance with an embodiment of the disclosure.

Although simulated live-fire is low-cost and safe, ultimately users such as military personnel and police officers must also train with live rounds. System 100 discussed above may be readily adapted to accommodate live rounds. For example, rather than distribute LEDs on the target, remote lasers may be arrayed with respect to the target. For example, as shown in FIG. 11, a plurality of modulated lasers 1105 may be positioned remotely from a target 1100. Lasers 1105 are arranged to project laser illuminated spots 1110 on target 1100. Each laser 1105 is modulated analogously as discussed with regard to LEDs 110. Thus, sensor 105 can distinguish illuminated spots 1110 just as it does LEDs 110. Projection of illuminated spots on the target in this fashion is quite advantageous in that target itself could be a projected image of a suitable target. In this fashion, a user could readily simulate live firing at otherwise awkward targets such as tank. Moreover, should live rounds be fired at the target, illuminated laser spots 1110 are plainly immune to any damage. It will thus be appreciated that as used herein, a "target emitter" may be an active device such as LEDs 110. Alternatively, a target emitter may be the passive effect of illuminated spots 1110.

Where applicable, the various components set forth herein may be combined into composite components and/or separated into sub-components without departing from the spirit of the present disclosure. Similarly, where applicable, the ordering of various steps described herein may be changed, combined into composite steps, and/or separated into sub-steps to provide features described herein. Embodiments described above illustrate but do not limit the disclosure. It should also be understood that numerous modifications and variations are possible in accordance with the principles of the present disclosure. Accordingly, the scope of the disclosure is defined only by the following claims.

What is claimed is:

1. A system comprising:
a detector comprising a lateral effect photodiode comprising a single contiguous active area configured to receive, at corresponding positions on the active area, uniquely modulated light from a plurality of emitters, wherein the detector is configured to generate output signals based on the received light; and
a processor configured to:
determine spectrums associated with the output signals, and
calculate, using the spectrums, pointing angles from the detector to the emitters.

2. The system of claim 1, wherein the processor is configured to:
detect, from the spectrums, spectral peaks associated with the emitters; and
use the spectral peaks to calculate the pointing angles.

3. The system of claim 1, wherein the processor is configured to determine the corresponding positions on the active area using the spectrums.

4. The system of claim 1, wherein the processor is configured to perform Fast Fourier Transforms (FFTs) on the output signals to determine the spectrums.

5. The system of claim 1, wherein at least two of the output signals are combined into a single combined output signal, wherein the processor is configured to determine at least one of the spectrums using the combined output signal.

6. The system of claim 1, further comprising optics configured to focus the received light onto the active area, wherein the positions of the received light on the active area are dependent on the pointing angles from the active area to the emitters.

7. The system of claim 1, wherein:
the lateral effect photodiode comprises a resistive layer;
a first one of the output signals is associated with a first current generated at a first portion of the resistive layer; and
a second one of the output signals is associated with a second current generated at a second portion of the resistive layer.

8. The system of claim 1, wherein:
the active area comprises a single PN junction;
the lateral effect photodiode further comprises a plurality of electrodes coupled to the PN junction; and
each electrode is configured to generate a corresponding one of the output signals based on the positions within the active area and the unique modulation frequencies of the received light.

9. The system of claim 1, wherein the output signals are analog signals, the system further comprising a plurality of analog-to-digital converters (ADCs) configured to convert the analog output signals to digital signals received by the processor.

10. The system of claim 1, further comprising a transmitter configured to transmit the pointing angles to a remote host computer.

11. The system of claim 10, wherein the transmitter is wireless WiFi transmitter or a wireless Bluetooth® transmitter.

12. The system of claim 1, wherein the emitters are attached to one or more static or dynamic targets.

13. The system of claim 1, wherein the emitters are attached to one or more human beings.

14. The system of claim 1, wherein the system is a sensor configured to operate with a live-fire simulation system.

15. A method comprising:
receiving, at corresponding positions on a single contiguous active area of a lateral effect photodiode, uniquely modulated light from a plurality of emitters;
generating output signals based on the received light;
determining spectrums associated with the output signals, and
calculating, using the spectrums, pointing angles from the detector to the emitters.

16. The method of claim 15, further comprising:
detecting, from the spectrums, spectral peaks associated with the emitters; and
using the spectral peaks to calculate the pointing angles.

17. The method of claim 15, further comprising determining the corresponding positions on the active area using the spectrums.

18. The method of claim 15, wherein the determining comprises performing Fast Fourier Transforms (FFTs) on the output signals to determine the spectrums.

19. The method of claim 15, further comprising:
combining at least two of the output signals into a single combined output signal; and
determining at least one of the spectrums using the combined output signal.

20. The method of claim 15, further comprising focusing the received light onto the active area using optics, wherein the positions of the received light on the active area are dependent on the pointing angles from the active area to the emitters.

21. The method of claim 15, wherein:
the lateral effect photodiode comprises a resistive layer;
a first one of the output signals is associated with a first current generated at a first portion of the resistive layer; and
a second one of the output signals is associated with a second current generated at a second portion of the resistive layer.

22. The method of claim 15, wherein:
the active area comprises a single PN junction;
the lateral effect photodiode further comprises a plurality of electrodes coupled to the PN junction; and
the generating comprises generating, by each electrode, a corresponding one of the output signals based on the positions within the active area and the unique modulation frequencies of the received light.

23. The method of claim 15, wherein the output signals are analog signals, the method further comprising converting the analog output signals to digital signals used to determine the spectrums.

24. The method of claim 15, further comprising transmitting the pointing angles to a remote host computer.

25. The method of claim 24, wherein the transmitting is performed by a wireless WiFi transmitter or a wireless Bluetooth® transmitter.

26. The method of claim 15, wherein the emitters are attached to one or more static or dynamic targets.

27. The method of claim 15, wherein the emitters are attached to one or more human beings.

28. The method of claim 15, wherein the method is performed by a live-fire simulation system.

* * * * *